United States Patent
Franceschini et al.

(10) Patent No.: US 8,085,709 B2
(45) Date of Patent: Dec. 27, 2011

(54) METHOD AND SYSTEM FOR MANAGING RADIO RESOURCES IN MOBILE COMMUNICATION NETWORKS, RELATED NETWORK AND COMPUTER PROGRAM PRODUCT THEREFOR

(75) Inventors: Daniele Franceschini, Turin (IT); Nicola Pio Magnani, Turin (IT)

(73) Assignee: Telecom Italia S.p.A., Milan (IT)

(*) Notice: Subject to any disclaimer, the term of this patent is extended or adjusted under 35 U.S.C. 154(b) by 896 days.

(21) Appl. No.: 11/662,298

(22) PCT Filed: Sep. 10, 2004

(86) PCT No.: PCT/EP2004/010104
§ 371 (c)(1),
(2), (4) Date: Mar. 9, 2007

(87) PCT Pub. No.: WO2006/027010
PCT Pub. Date: Mar. 16, 2006

(65) Prior Publication Data
US 2008/0043623 A1    Feb. 21, 2008

(51) Int. Cl.
*H04L 12/56* (2006.01)
(52) U.S. Cl. ..................... 370/328; 455/414.1
(58) Field of Classification Search .......... 370/229–240, 370/328–338, 389–427, 473–474; 455/403–414.4; 709/230–237
See application file for complete search history.

(56) References Cited

U.S. PATENT DOCUMENTS

| 6,374,112 | B1 | 4/2002 | Widegren et al. |
| 6,400,755 | B1* | 6/2002 | Harris et al. ................. 375/146 |
| 2002/0161914 | A1* | 10/2002 | Belenki ........................ 709/235 |
| 2004/0047289 | A1* | 3/2004 | Azami et al. .................. 370/230 |
| 2004/0166835 | A1* | 8/2004 | Johansson et al. ......... 455/414.1 |

FOREIGN PATENT DOCUMENTS

| GB | 2 397 469 | 7/2004 |
| GB | 2397469 A * | 7/2004 |

OTHER PUBLICATIONS

Laakso et al; "Radio Resource Management", WCDMA for UMTS, Ed. Holma et al., John Wiley & Sons, pp. 183-215,(2002).*
Laakso et al; "Radio Resource Management", WCDMA for UMTS, Ed. Holma et al., John Wiley & Sons, pp. 183-215, (2002).
Bernardi, et al., "Load Control Strategies for Mixed Services in WCDMA," IEEE, U.S., vol. 2, Conf. 51, pp. 825-829, (May 15, 2000).

* cited by examiner

Primary Examiner — Kent Chang
Assistant Examiner — Kashif Siddiqui
(74) Attorney, Agent, or Firm — Finnegan, Henderson, Farabow, Garrett & Dunner, L.L.P.

(57) ABSTRACT

A method for managing radio resources in a mobile communications network having a plurality of cells, wherein the radio resources are managed by a plurality of radio resources management procedures arranged for having available at least one maximum downlink total load value representative of the maximum total load level of each cell of the network; and for measuring at least one uplink load value and at least one current downlink total load value of each cell of the network. The method includes the steps of defining at least two status parameters including a first status parameter or load status parameter adapted to reach a first set of status ranges, depending on the measured uplink load value and the current downlink total load value; a second status parameter or packet congestion flag adapted to reach a second set of status ranges, depending upon reaching of a congestion status in a packet management procedure; and adopting different sets of managing strategies associated with the radio resources management procedures of the network as a function of the at least two status parameters being in the respective sets of status ranges. Preferred application is in UMTS mobile networks.

39 Claims, 3 Drawing Sheets

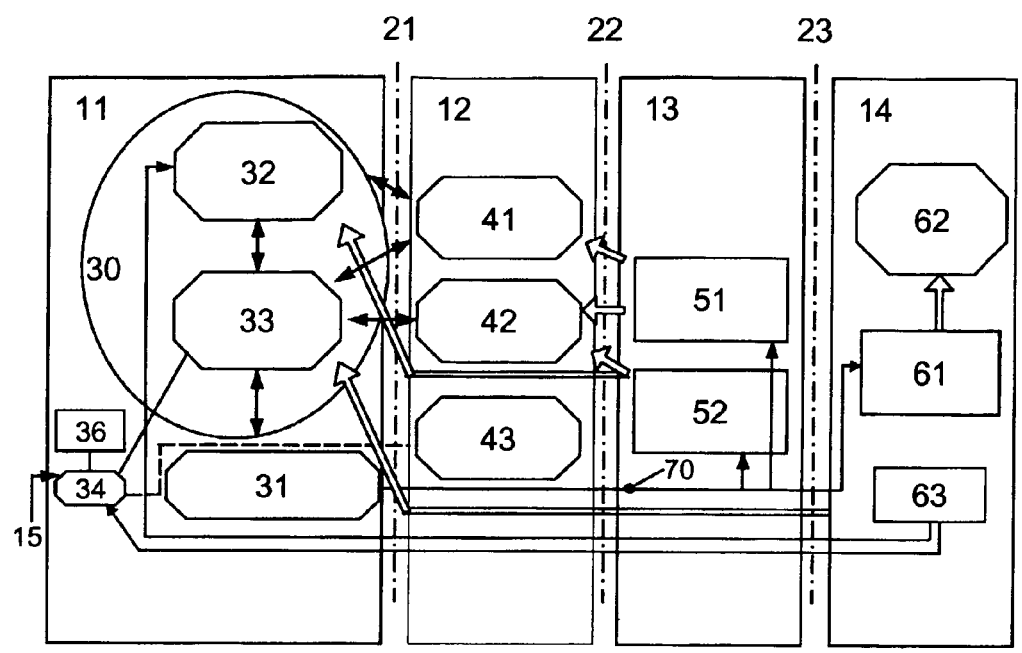
Fig_1
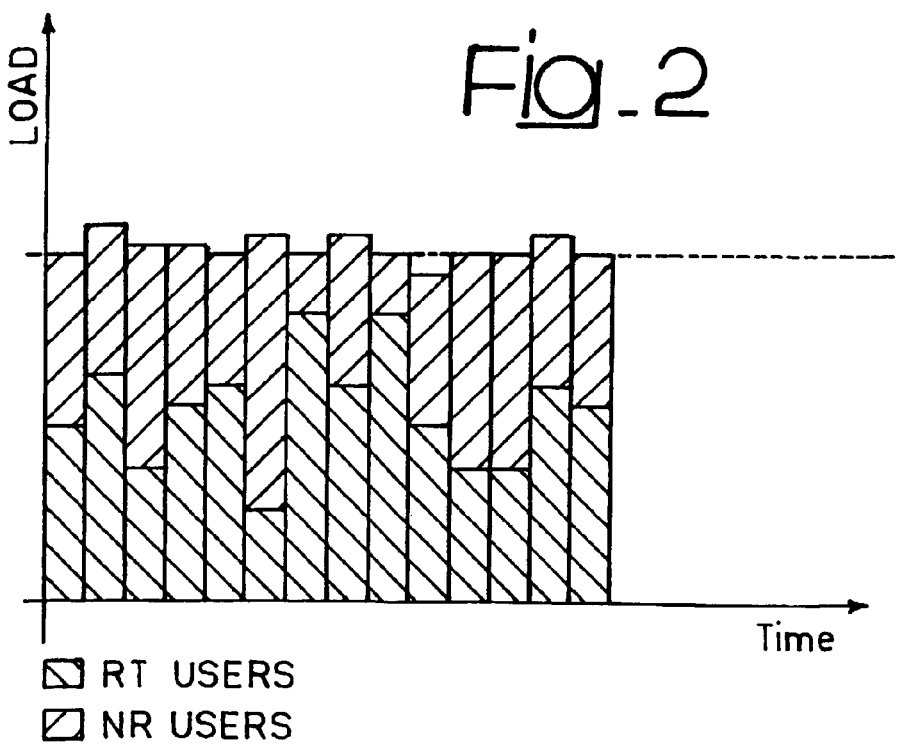
Fig_2

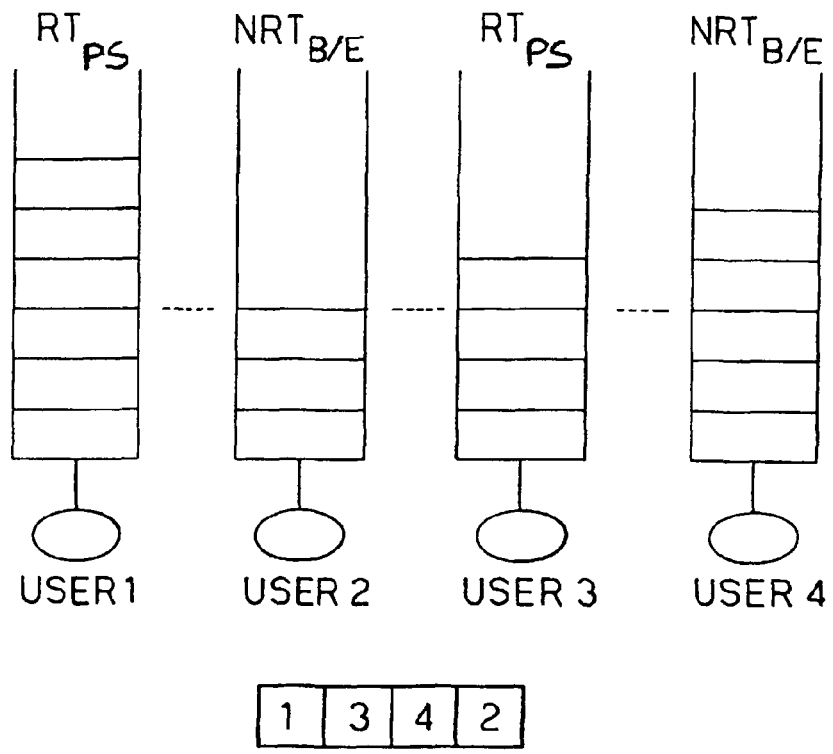
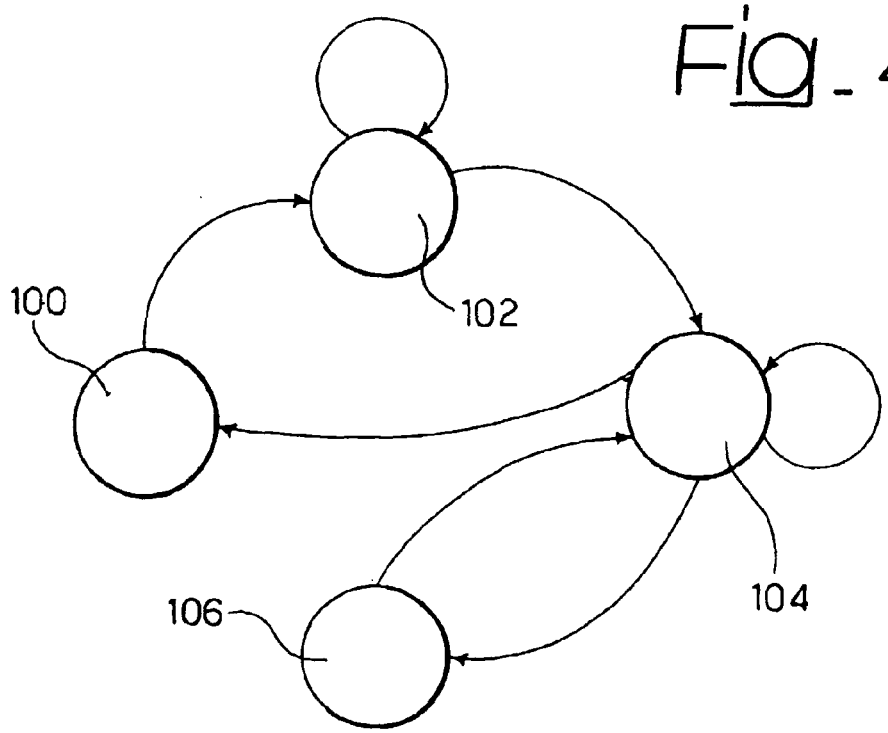

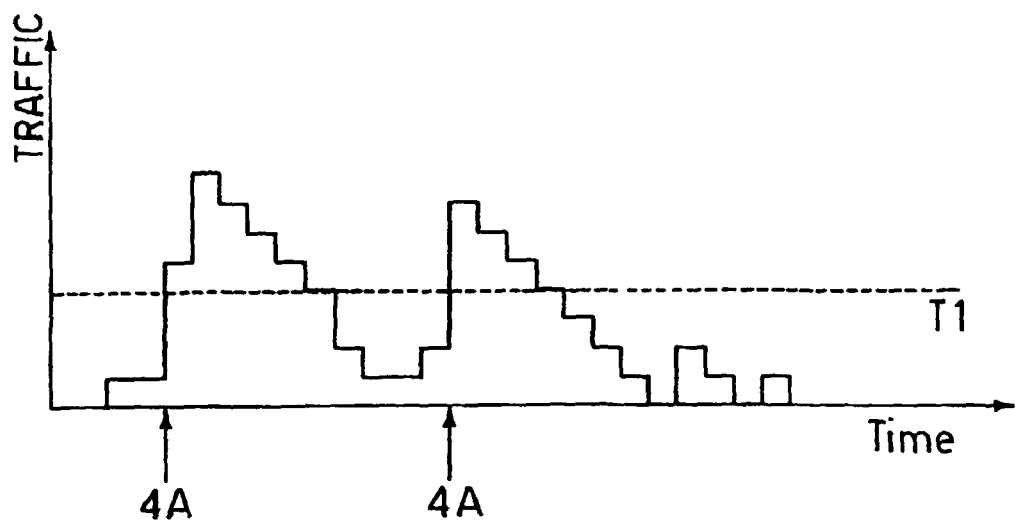
Fig_5
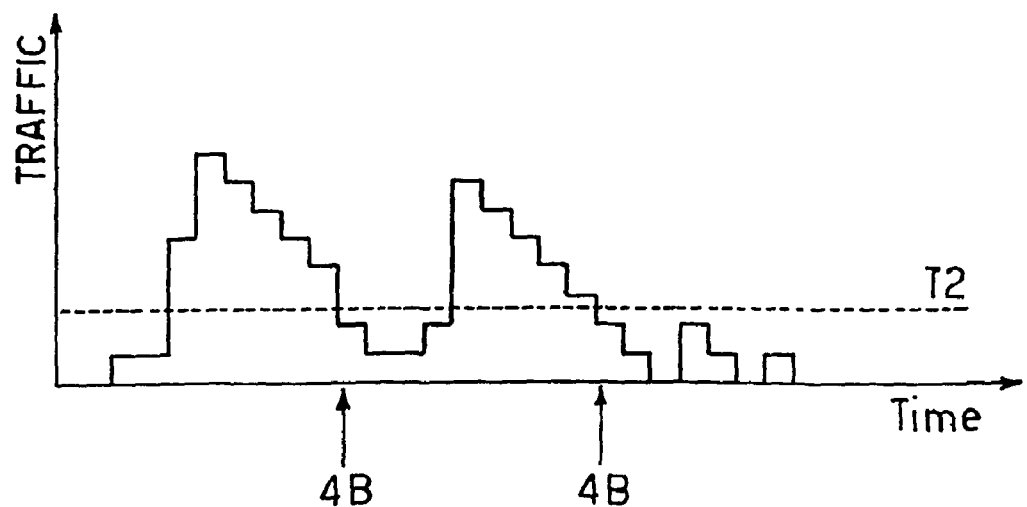
Fig_6

METHOD AND SYSTEM FOR MANAGING RADIO RESOURCES IN MOBILE COMMUNICATION NETWORKS, RELATED NETWORK AND COMPUTER PROGRAM PRODUCT THEREFOR

CROSS REFERENCE TO RELATED APPLICATIONS

This application is a national phase application based on PCT/EP2004/010104, filed Sep. 10, 2004, the content of which is incorporated herein by reference.

FIELD OF THE INVENTION

The present invention relates to techniques for Radio Resources Management (RRM) in mobile networks, such as e.g. a mobile network based on a CDMA (Code Division Multiple Access) radio interface.

DESCRIPTION OF THE RELATED ART

The standard identified as 3GPP (Third Generation Partnership Project) 25.992 describes the Radio Resource Management (RRM) represented as a set of procedures implemented in a CDMA mobile radio access network (in the following referred to as 'system') by means of equipments in charge of the control of radio resource for managing access by user terminals to the network.

For instance, in UMTS networks RRM is implemented in that part of the radio access network designated Radio Network Controller (RNC).

As known, the RRM comprises one or more modules for implementing a determined number of radio procedures (radio procedures and parameters supported by the radio protocols) that ensure the optimization of user terminal calls, in conformity with a predetermined standard.

For instance, the RRM in the RNC allocates the proper radio resources for supporting access of the user terminals to multimedia services having different QoS classes (e.g., video call, web browsing, etc.).

One RRM module can be regarded as a set of different procedures, subdivided in groups, each of which aims at optimizing a specific aspect of the radio interface.

The set of procedures making RRM function can be arranged, for instance, in three main groups, namely:

i) those procedures concerned with the channel allocation in the system: taking as example the UMTS case, whenever a new service is requested by a determined user terminal, the UMTS radio access network, named UTRAN (UMTS Terrestrial Radio Access Network), allocates a bearer for the support of that particular application that is requested; such procedures include the configuration procedures of the radio protocols, the set up of a proper channel on the air interface and the set up of proper links on the interfaces between all the entities of the mobile network. According to the UMTS terminology, the allocated bearer is called RAB (Radio Access Bearer), and the procedures cooperating to manage the channel allocation to support the different required services are called RAB management;

ii) those procedures concerned with the optimization of packet transmission on the radio interface: such procedures include, e.g., Packet Scheduling (PS) and Transport Channel Type Switching (TCTS). In particular, the Packet Scheduling procedure aims at optimizing the packet transmission for all those packet switched services for which the system allocated a dedicated channel (DCH). The Transport Channel Type Switching (TCTS) procedure aims, for instance, at adapting the allocated band to the real change of service, as required, for instance by the user terminal, switching, for instance, from dedicated channel to common channel operation;

iii) those procedures concerned with the capacity optimization: such procedures include for instance Admission Control (AC) and Congestion Control (CC). The Admission Control procedure, checks whether the admission of a new call is likely to generate an increment of the interference level in the system exceeding the absolute interference limit set by the operator. In fact, in CDMA based systems like UMTS, controlling the level of interference is of paramount importance. In particular, whenever a new call is generated by a user terminal, if the threshold set by the operator is likely to be exceeded, the new call is rejected, otherwise the new call is admitted;

the Congestion Control (CC) procedure checks that the level of interference generated by the calls that are already in progress does not increase beyond a certain threshold imposed by the operator. The increase can be due, for instance, to changes in the propagation conditions or to changes in the characteristics of the service provided to the user terminals.

Procedures of the first group concerned with channel allocation in the system are known e.g. from U.S. Pat. No. 6,374,112. Such a document deals with RAB management in the UTRAN network and discloses an RRM module suitable for solving the problem of channel allocation in the system by taking into account the specific Quality of Service (QoS) requirement of each request. Whenever a new application service is requested, the user terminal sends to the UMTS network a number of information items required by the network to properly support the application service. Such information corresponds to the QoS information and includes a number of parameters that are used by the UTRAN to properly set up the RAB.

In the arrangement described in the prior art document, when establishing each bearer, the UTRAN network flexibly maps or allocates the radio access bearer onto physical transport resources through the UTRAN network and radio channel resources over the radio/air interface. The known architecture is built in order to guarantee that the mapping between QoS information of the RAB and the configuration of the radio protocols ensures the respect of the QoS required by the user terminal requesting a determined application service.

A drawback of the solution described in the foregoing resides in that QoS driven procedures fail to completely optimize the system, i.e. the capacity of the system is not properly maximized in all the network working conditions.

Applicant believes that the known arrangement is able to grant the required QoS to the admitted users but is not able to grant the exploitation of the maximum capacity of the system in terms of channel allocation.

Procedures of the second group concerned with packet transmission optimization are known from U.S. Pat. No. 6,400,755. That document proposes a solution based on a general scheme where the bit rate of a link on a dedicated connection is dynamically changed and/or switched to a common channel.

A specific RRM module manages the adaptation of the throughput of the packet switched services to the different working conditions of the network.

Applicant believes that the above solution is not able to maximize the capacity of the system since it takes into account only packet scheduling, i.e., only one part of the RRM functionalities.

Procedures of the third group are known, for example, from "WCDMA for UMTS, Harri Holma and Antti Toskala; 12 Sep. 2002" wherein there are disclosed methods for controlling the admission of new calls to the system by taking into account solely the amount of interference or load generated by each new call.

Applicant believes that the above known art suffers the same problems of the already cited known arts.

In general, procedures of RRM are known from the book Radio Network Planning and Optimisation for UMTS by Jaana Laiho, Achim Wacker, Tomáš Novosad, Jaana Laiho.

The above document describes an architecture in which the different RRM modules or blocks, can have different behaviors as a function of the system load in terms of transmitted and received power. According to the known document, the transmitted and received power are used for determining the system load and, as a function of the system load, three states of the system are defined (Normal, Preventive, Overload) and globally managed.

The known document, therefore, indicates global possible actions for the different RRM modules or blocks as a function of the three states of the system, so defined.

The Applicant believes that the determination of the sole system load is not enough for implementing RRM procedures able to optimize the system in all working conditions.

OBJECT AND SUMMARY OF THE INVENTION

The need therefore exists of providing an Arrangement adapted to overcome the intrinsic drawbacks of the prior art considered in the foregoing. Specifically, the need is felt for an arrangement that allows for a comprehensive, complete optimization of the procedures composing the Radio Resources Management function.

According to the present invention, that object is achieved by means of a method having the features set forth in the claims that follow. The invention also relates to a corresponding system, a related network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed modular fashion.

Specifically, the present invention defines a preferred embodiment of a complete architecture for the Radio Resource Management (RRM) for a CDMA based mobile network such as a network operating according to the UMTS (Universal Mobile Telecommunications System) standard.

Applicant proposes an integrated architecture for the optimization of system capacity by controlling and minimizing the level of interference in the system and the efficient use of the resources, e.g. packet resources, and then controlling accordingly a set of the three main groups of optimization procedures of Radio Resource Management considered in the foregoing.

Preferably, the arrangement described herein introduces a load system status parameter (load status parameter) or SP defined on the basis of measurements related to interference and load of the system, and a packet system status, from now on named packet congestion flag (PCF) or packet flag, defined on the basis of real use of packet resources in the system. The values that can be assumed by the pair of load system status and packet flag define the real status of the system or system status. The proposed approach, allows to implicitly define a (global) system status that takes then into account not only the interference level of the system (the system load), but also the level of congestion of packet resources (the packet congestion flag).

In fact, Applicant believes that the level of congestion of packet resources does not strictly depends from the interference only, but also on how the RAB management, Packet scheduling, Admission Control and Congestion Control procedures interact with each other.

In fact, applicant believes that a complete optimization in the RAB management, Packet scheduling, Admission Control and Congestion Control procedures can be achieved by triggering proper interactions among different groups of procedures as a function of the interference conditions of the system (load status parameter or SP) and of the packet level of congestion of the resources (the packet congestion flag).

The load status parameter, preferably, does assume three different states as a function of the load of the system.

The packet congestion flag, which takes into account the real use of packet resources in the system according to a preferred embodiment of present invention, does assume two different states and depends on the system load, on the hardware network resources (corresponding to the hardware installed in the real network), and on the instantaneous characteristics of the packet traffic (determined, e.g. only monitoring on the real network the application services, e.g. Web Browsing, Multimedia, etc.).

Each pair of values reached by the load status parameter SP and packet congestion flag PCF, in principle, triggers a different behavior in each group of procedures, irrespective of the specific methods that the RRM procedures implement.

To achieve independence from specific methods, a number of different interactions and predefined interworking interfaces are defined, between the three groups of procedures, in order to control and possibly minimize the level of interference in the system, and to exploit at the maximum the available packet resources.

The system status is continuously monitored and changed in real time, by means of a continuous update of the load system status parameter and the packet flag.

The load status parameter and the packet flag, determining the system status, are used, according to a preferred embodiment of present invention, to synchronize the strategies of RRM procedures.

Preferably, the load status parameter can assume different load states as a function of, e.g. the network uplink and downlink load.

Preferably, the packet flag, can assume different states as a function of the level of occupancy of the packet buffer in the network (corresponding to the packet congestion level in the system), and as a function of the average fraction of the total available power used for packet transmission.

In summary, the proposed invention defines a system status of the radio resources, as a function of the possible values of load status parameter and of the packet flag.

The arrangement described herein defines coordinated strategies among the different RRM procedures for each system status.

BRIEF DESCRIPTION OF THE ANNEXED DRAWINGS

The invention will now be described, by way of example only, by referring to the enclosed figures of drawing, wherein:

FIG. 1 is a schematic representation of a typical context of use of the arrangement described herein, FIG. 2 is a diagram representing an operation of the arrangement described herein, and FIG. 3 is a schematic representation of a further operation performed by the arrangement described herein, and FIG. 4 is a diagram exemplary of possible operation of the arrangement described herein;

FIGS. 5 and 6 are diagrams exemplary of possible events in the case of the arrangement described herein.

DETAILED DESCRIPTION OF PREFERRED EMBODIMENTS OF INVENTION

FIG. 1 shows a schematic view of an architecture for radio resources management in a UMTS mobile communication network (not shown as a whole).

According to present invention, the RRM architecture comprises a plurality of nodes, including hardware and software nodes.

For instance, the RRM architecture comprises a serving radio network controller 11, a controlling radio network controller 12, a base station 13 and an user equipment 14.

The serving radio network controller, or S-RNC in the UMTS standard, indicated as whole by the reference 11 is interfaced through a first radio interface 21, (the so-called Iur interface in the UMTS standard), with the controlling radio network controller or, for example, C-RNC according to the UMTS standard 12.

The C-RNC 12 is in turn interfaced through a second radio interface 22, the UMTS Iub interface, with the base station 13, corresponding to the Node B in the UMTS standard. Finally, the base station 13 communicates with the user equipment 14 through a third radio interface 23, called Uu interface in the UMTS standard.

The S-RNC 11 is a Radio Network Controller module equipped with a Radio Resource Control (RRC) connection with a user equipment 14. The serving radio network controller 11 is responsible for the user mobility within the UTRAN network and is also the point of connection towards a Core Network 15.

The C-RNC 12 is the Radio Network Controller module that is responsible for the configuration of a specific base station 13. A user equipment 14 accessing the system will send an access message to a base station 13, which in turn will forward this message onto its respective C-RNC 12.

The base station 13 comprises, as known, a service area comprising, for instance, one ore more cells and is able to provide radio links to the user equipments 14.

For instance, the base station 13 within the UMTS network provides the physical radio link between the user equipment 14 and the network. While ensuring the transmission and reception of data across the radio interface of each cell, the base station 13 also applies the codes in each cell that are necessary to describe channels in a CDMA system.

The user equipment 14 represents the UMTS subscriber, i.e. substantially a combination of Mobile Equipment and SIM/USIM module (Subscriber Identity Module/UMTS Subscriber Identity Module).

The S-RNC 11 thus comprises a RAB management module 31 and a packet management module 30, that in turn includes a transport channel type switching module 32, a packet scheduling module 33, and a traffic volume monitoring module TV 36, of known type.

The C-RNC 12 includes an admission control module 41 and a congestion control module 42, of known type.

The base station 13 comprises a common measurements module 51 for operating on the common channel and a dedicated measurement module 52 for operating on the dedicated channel, of known type.

The user equipment 14 comprises a module 61 for measuring the "inter" frequency and the "intra" frequency, a module 62 for evaluating cell selection and cell reselection, and a module 63 to evaluate a traffic volume TV of the packet switched transmission in the UE 14, all of known type.

FIG. 1 shows a generic link, indicated by the reference number 70, connecting the S-RNC 11 to the user equipment 14, through the C-RNC 12 and the base station 13. The common measurement module 51 and the dedicated measurement module 52 measure the power on the different channels comprising the uplink and/or the downlink sections on the generic link 70.

In order to determine the load and the congestion of each cell of the base station 13, a number of measurements are performed at the base station 13. This occurs by means of the common measurement module 51 and the dedicated measurement module 52. The following results are reported to the C-RNC 12 through the second interface 22:

the RTWP (Received Total Wideband Power) measurement, defined as the received wide band power, including noise generated in the receiver, within the bandwidth defined by a pulse shaping filter;

the Transmitted Carrier Power measurement, that is the ratio between the total transmitted power and the maximum transmission power.

A load status parameter SP is defined, according to a preferred embodiment of present invention, as a function of the values of the RTWP and Transmitted Carrier Power measurements.

The load status parameter SP may take on, for instance, three different states S, depending on the ranges of such values, namely:

normal operation state (NO): this can be considered as the initial load state and it occurs when, for example, the following two conditions are simultaneously verified:

(RTWP/Thermal Noise Power)$\leq$70% of the maximum Noise_Rise on the uplink;

Transmitted Carrier Power$\leq$70% Maximum Allowed Power on the Downlink;

alert operation state (AO): this load state is reached when, for example, the following two conditions are simultaneously verified:

70% of the maximum Noise_Rise on the uplink <(RTWP/Thermal Noise Power)$\leq$90% of the maximum Noise_Rise on the uplink;

70% Maximum Allowed Power on the Downlink<Transmitted Carrier Power$\leq$90% Maximum Allowed Power on the Downlink;

pre-congestioned operation state (PCO): this load state is reached when, for example, the following two conditions are simultaneously verified:

90% of the maximum Noise_Rise on the uplink <(RTWP/Thermal Noise Power)$\leq$the maximum Noise_Rise on the uplink;

90% Maximum Allowed Power on the Downlink <Transmitted Carrier Power$\leq$Maximum Allowed Power on the Downlink.

As an additional example, the normal operation state (NO) is characterized by the following two conditions:

(RTWP/Thermal Noise Power)≦70% of the maximum Noise_Rise on the uplink; and

Transmitted Carrier Power≦70% Maximum Allowed Power on the Downlink;

alert operation state (AO): this load state is characterized by, in this additional example, the following two conditions:

70% of the maximum Noise_Rise on the uplink<(RTWP/Thermal Noise Power)≦90% of the maximum Noise_Rise on the uplink; and Transmitted Carrier Power≦90% Maximum Allowed Power on the Downlink;

or by the following two conditions:

70% Maximum Allowed Power on the Downlink<Transmitted Carrier Power≦90% Maximum Allowed Power on the Downlink; and (RTWP/Thermal Noise Power)≦90% of the maximum Noise_Rise on the uplink;

pre-congestioned operation state (PCO): this load state is characterized by, in this additional example, the following two conditions:

90% of the maximum Noise_Rise on the uplink<(RTWP/Thermal Noise Power)≦the maximum Noise_Rise on the uplink; or 90% Maximum Allowed Power on the Downlink<Transmitted Carrier Power≦Maximum Allowed Power on the Downlink.

As a third example, the normal operation state (NO) is characterized by the following two conditions:

(RTWP/Thermal Noise Power)≦70% of the maximum Noise_Rise on the uplink; and

Transmitted Carrier Power≦70% Maximum Allowed Power on the Downlink;

pre-congestioned operation state (PCO): this load state is characterized by, in this third example, the following two conditions:

90% of the maximum Noise_Rise on the uplink<(RTWP/Thermal Noise Power)≦the maximum Noise_Rise on the uplink; and 90% Maximum Allowed Power on the Downlink<Transmitted Carrier Power≦Maximum Allowed Power on the Downlink;

alert operation state (AO): the system is considered in this load state, in this third example, in all other cases.

Numerical values in the definitions above are provided merely as example: it is up to the operator to set these values.

In order to perform the evaluations in question a load status monitor module 43 is provided in the C-RNC 12 for continuously monitoring the RTWP and the Transmitted carrier power and then calculate the corresponding state assumed by the load status parameter SP.

In order to define the effective usage of packet resources and consequently the level of congestion in the scheduling of packet transmission of the network, a number of measurements are performed in the terminal 14 and at the S-RNC 11.

The measurements occur by means of the traffic volume measurement module TV 36 in the S-RNC 11 and by means of the traffic volume measurement module TV 63 in the UE 14. In particular, for the evaluation of the level of congestion in the packet transmission the following measurements, reported to the S-RNC 11 through the interfaces 21, 22 and 23 may be important:

Event 4a and 4B in the terminal: the buffer in the terminal for a certain packet switched connection in the uplink becomes greater than a threshold T1 defined by the operator (event 4a) or lower than another threshold T2 (event 4b) defined by the operator.

Event 4a and 4B in the network (in the S-RNC 11): the buffer in the S-RNC 11 for a certain packet switched connection in the downlink becomes greater than a threshold T1 defined by the operator (event 4a) or lower than another threshold T2 (event 4b) defined by the operator.

According to a preferred embodiment of present invention, a packet status parameter, named packet congestion flag PCF, is defined, as a function of the values of the buffer occupancy and the power allocated on the downlink to packet connections.

The packet congestion flag PCF may assume, for example, two different states, depending on the level of congestion in the packet transmission:

a First PCF state named Packet Congestion state wherein the packet scheduling procedure, starting from the post-processing of the above mentioned measurements evaluates the following metrics:

A) the Average Throughput of packet switched best effort service is less than the parameter Bit_Rate_Min_BE, indicating the minimum best effort bit rate;

B) the average delay for packet switched best effort service is greater than the parameter Delay_Max_BE, indicating the maximum best effort delay;

C) the average delay for packet switched real time service is greater than the parameter Delay_Max_RT, indicating the maximum real time delay;

If all the conditions A, B, C are true a packet congestion is declared and packet congestion flag PCF is set, since the system in now on working in a Packet Congestion State.

a Second PCF state named Normal Packet State wherein no congestion in the packet resources usage is observed (i.e., at least one of the conditions A, B, C is false).

In order to perform the evaluations in question, according to a preferred embodiment of present invention a packet status monitor module 34 is provided in the S-RNC 11 for continuously monitoring the conditions A), B), C) and then calculate the corresponding state assumed by packet congestion flag parameter PCF.

Whenever the load or the packet state is changed the load status monitor module 43 and the packet status monitor 34 notify the new state to the admission control module 41, to the packet scheduling module 33, to the transport channel type switching module 32 and to the RAB management 31.

By means of the load status parameter SP and the packet congestion flag PCF it is possible to define a system status S that triggers different behaviors in each single procedure belonging to the RRM function.

In order to highlight the QoS classes that are taken into account in the arrangement described herein, Table 1 below provides a description of the QoS classes considered in UMTS as standardized by the 3GPP:

TABLE 1

| Traffic class | Conversational class Conversational RT | Streaming class Streaming RT | Interactive class Interactive best effort | Background Background best effort |
|---|---|---|---|---|
| Basic characteristics | Preserve time relationship (variation) between information entities of | Preserve time relationship (variation) between information | Request response pattern Preserve payload content | Destination is not expecting the data within a certain time Preserve |

TABLE 1-continued

| Traffic class | Conversational class Conversational RT | Streaming class Streaming RT | Interactive class Interactive best effort | Background Background best effort |
|---|---|---|---|---|
| Example of application | the stream Conversational pattern (stringent and low delay) Speech, video . . . | entities of the stream (i.e. some delay, constant Facsimile (NT) Streaming audio and video | Web browsing | payload content Background download of e-mail |

From this perspective three different QoS classes are defined for the RRM architecture:

real time services (RT) : this class includes all the services that present real time constraints. According to the UMTS 3GPP Release 99 (R99) standard, all the services belonging to the Conversational and streaming class and carried over the circuit switched (CS) domain of the UMTS Core Network are included in this category;

real time packet switched services ($RT_{PS}$): this class includes those services that present real time constraints, but that are carried over the packet switched (PS) domain of the UMTS;

non real time best effort services ($NRT_{BE}$): this class, (referred also as PS_Best_Effort services) includes all the services that present no real time constraints.

As far as the $RT_{PS}$ family of services concerns, according to 3GPP UMTS Release 99 and Release 5 standard the streaming applications can be carried also on the packet switched domain. Moreover, according to 3GPP UMTS Release 5 and 6 also conversation can be carried over the PS domain, and as a consequence PS conversational may be included in the $RT_{PS}$ class. Anyway, in order to fulfill the above standard requirements for transmission in the packet domain, the packet switched services can not be any more best effort services but some QoS mechanisms must be introduced.

As far as the $NRT_{BE}$ family of services concerns, according to the UMTS 3GPP R99 standard all the services belonging to the interactive and background class and carried over the packet switched domain of the UMTS packet switched Core Network are included in this category. The interactive class has a higher priority over background class and can be distinguished, for instance, by means of the traffic handling priority parameter.

The main aim of the packet management module 30 is to optimize the packet transmission on the radio interface for all the packet switched services including both real time and not real time packet switched services. The QoS requirements of non real time best effort packet switched services ($NRT_{BE}$) show the necessity of ensuring a very low packet error ratio even if some delays can be tolerated for single services. Moreover, Table 1 above shows that packet switched services belonging to the interactive and background class, such as the Web Browsing service or the e-mail service are best effort services (i.e. no guaranteed bit rate is ensured). In this perspective, the delay tolerant and the best effort characteristics of some of the packet switched services allow a degree of flexibility in reducing interference and, consequently, in optimizing capacity.

The following is a description of the interaction of Packet Scheduling with the Admission Control and RAB Management procedures.

According to the arrangement described herein, the general approach in managing packet services is that a non stringent admission_is performed for best effort services, since the delay tolerant and best effort characteristics allow to support these services with lower requirements in terms of resources in comparison with real time services. In particular in the normal state when the packet congestion flag PCF is not set, each PS_Best_Effort is evaluated as, for instance, a 8 kbps service in despite of the maximum bit rate required by the service.

The PS_Best_Effort service is evaluated in the admission decision taking into account in the resource occupation calculation a minimum portion of its maximum bit rate because its QoS class is a best effort one and its admission is not binding since its instantaneous throughput can be reduced at each time by the system. 8 kbps is a numerical value in the definition above that is provided merely as example: it is up to the operator to set these values.

On the other hand when packet management congestion is reached in buffer management, i.e., for instance when the buffers allocated to each user starts to become full, in a predetermined range or are full, the packet congestion flag PCF triggers a behaviour in the admission control module and RAB management module in order to change the admission and RAB management policies. In this case the admission control for packet switched Best Effort services is performed in a more stringent way than in the previous case, hindering real time admission.

In the preferred embodiment it is proposed that, if the congestion packet flag PCF is set no packet switched best effort services are admitted at all. As an alternative in a further embodiment, packet switched best effort service could be admitted but taking into account an admission factor, for instance in the preferred embodiment, a 90% of the maximum throughput required by the service is taken into account in the admission decision.

The admission factor could assume different values as a function of the thresholds that are used to define the packet congestion. This further embodiment allows to serve an higher number of packet switched services properly modulating the quality of service of each connection.

Starting from this general approach, whenever a new service or a new radio link addition is requested, the admission control module 41 and the RAB management module 31 behave according to the following strategy in the normal operation state:

a) for packet switched services belonging to $RT_{PS}$ (e.g. a service belonging to the PS streaming class according to 3GPP R99), also named as real time packet switched services a dedicated channel is set up according to a procedure that will be better described in the following in detailing the operation of RAB management module 31; in the admission control module 41, if no packet congestion flag PCF is triggered, the service is admitted taking into account a bit rate equal, e.g., to 50% (as Scaling_Factor) of the guaranteed bit rate; if the packet congestion flag PCF is triggered the new service is treated as a pure CS real time service;

b) for all packet switched services belonging to the interactive and background classes whose maximum bit rate is less or equal to, e.g., 16 Kbps, common channels are allocated, RACH (Random Access Channel) channels in the uplink and FACH (Forward Access Channel) channels in the downlink, respectively, in UMTS terminology; in this case the admission control follows the rules specified for common channels if the packet congestion flag PCF is not set;

c) for all the packet switched services belonging to Interactive and background classes whose maximum bit rate is greater than 16 Kbps a dedicated channel DCH is allocated using techniques better described in a following part of the description where operation of the RAB management module 31 is detailed; for this category of services, if no packet congestion flag PCF is triggered, the admission control module 41 performs an admission check based on a bit rate of ,e.g., 8 kbps for both the uplink and downlink; this means, as already anticipated, that no real admission is performed for packet switched best effort services. If the packet congestion flag PCF is triggered, the admission control module 41 does not admit any request of interactive and background traffic classes.

As an alternative in a second embodiment when the packet congestion flag PCF is triggered, packet switched best effort service could be admitted but taking into account an admission factor, for instance in the preferred embodiment, a 90% of the maximum throughput required by the service is taken into account in the admission decision. The admission factor could assume different values as a function of the thresholds that are used to define the packet congestion.

The packet management module 30 shown with reference to FIG. 1 and located in the RRC layer of the S-RNC 11 includes the transport channel type switching module 32 and the packet scheduling module 33.

The transport channel type switching module 32 monitors the transmission characteristics of each single Packet Switching connection in order to command the transition from common channel to dedicated channel or viceversa.

The packet scheduling module 33 manages the packet transmission of packet switched services supported on dedicated channel links in order to optimize the radio interface.

Since the UMTS system is a power shared system all the procedures must contribute to transmit a power level as low as possible on the radio interface. The transport channel type switching module 32 and the packet scheduling module 33 are configured correspondingly.

Thus the transport channel type switching module 32 monitors the transmission buffer of each single packet switched link in order to check if the type of transport channel allocated to support a certain service is correct or not.

In general a packet switched service can be supported on:

a common channel, RACH/FACH, when the packet switched service requires the transmission of small and low frequency packets (e.g. SMS service);

a dedicated channel (DCH) when the service requirements in terms of minimum bit rate required are high (e.g. fast web Browsing service).

The packet management module 30 manages downlink packets. Significant parameters that limit downlink system resources are:

maximum power of the base station 13;

lack of perfect orthogonality between downlink user codes;

interference originated by other cells and detected at user equipments 14.

When the load status parameter SP indicates a normal operation state, the scheduling procedure in the packet scheduling module 33 operates as follows.

Decision are based on:

traffic information pertaining to the number of active $RT_{PS}$ links and their transfer speed characteristics and Signal to Interference Ratio (SIR) pursued as a target $SIR_{target}$;

information pertaining to data links established on the dedicated channel and their transfer speed, $SIR_{target}$ value and type of requested service characteristics;

information pertaining to transport formats (TF) associated with each data link on the dedicated channel; and buffer occupation expressed as the amount of bytes still to be transmitted (for instance taking into account the buffer occupation at RLC (Radio Link Control) level).

The 3GPP-25.301 Radio Interface Protocol Architecture (Release 1999) and 3GPP-25.322 Radio Link Control (RLC) protocol specification (Release 1999), envisages a number of levels of access protocols terminated in the S-RNC, for dedicated channels (DCH). The levels are:

L1 (physical)

MAC (Medium Access Control)

RLC (Radio Link Control), e

RRC (Radio Resource Control).

The RRM architecture here described makes use of protocols provided by the standard for implementing its strategies.

The first three types of information can be found directly in the S-RNC 11. Knowledge of the amount of bytes still to be transmitted, i.e. buffer occupancy, for instance at RLC level, through a suitable interworking among RLC, MAC and RRC, can be made available to the MAC level. Then, this information is passed through interworking between the two levels, to the RRC level, where the decisional part of the scheduling procedure resides.

The steps in the procedure described are substantially three:

residual capacity estimation;

priority determination;

resource assignment.

As regards residual capacity calculation and priority determination in the RRC level the procedure resides in the serving RRM, in the S-RNC 11.

Resource assignment evaluates the rate to be assigned to each user and, as a consequence, assigns the transport format, i.e. how many blocks must be taken from the buffer at each transmission time interval (TTI). That function also resides in the serving RRM.

The packet scheduling module 33 pursues optimization of resource usage, ensuring an efficient use of the whole capacity of the cell. The packet scheduling module 33 is configured for calculating, based on knowledge of the characteristics of the services supported by the cell and the number of active users, the residual capacity left available by real time services that have maximum priority. Such a residual capacity is available for the packet switched services.

Different solutions can be adopted in order to estimate such a residual capacity. An increased accuracy in the estimation leads to better results in allocating the residual capacity.

By way of example, the residual capacity can be determined by observing, that, in order to adequately support a given service, the following relation, of known type, must be satisfied in the downlink:

$$\left[\frac{E_b}{N_0}\right]_{j,k} = \frac{W}{r_{j,k}} \frac{P_{j,k} h_{j,k}}{I_{int,k} + I_{ext,k} + \eta_0 W} \geq \gamma_j \quad j = 1 \ldots N$$

where:

W is the chip rate, e.g. 3.84 Mchip/sec;

$P_{jk}$ is the allocated power for each user j in the cell K;

$r_{jk}$ is the bit rate of user j in the cell k, $I_{int,k}$ is the intracell interference of cell k, $I_{exit,k}$ is the intercell interference;

$\eta_0$ is the spectral density of the thermal noise;
$\gamma_j$ is the $E_b/N_0$ target for supporting the service requested by the user j;
$h_{jk}$ is the path loss.

The scheduling technique described here by way of example is focused on downlink transmission. The following description will thus focus on downlink transmission.

The downlink cell load can be expressed, by means of the following formula of known type:

$$\eta_{DL} = \sum_{i=1}^{N} \frac{1}{1 + \frac{W}{r_{j,k}\gamma_i}} ((1 - \alpha_i) + f_i)$$

where f is the ratio between the intercell interference and the intracell interference measured at the user equipment 14 and $\alpha_i$ is the orthogonality factor, i.e. the parameter that takes in account the orthogonality among codes assigned to N users.

Such an expression can be simplified by taking into account the mean value of $\alpha_i$ and f:

$$\overline{\eta_{DL}} = \sum_{i=1}^{N} \frac{1}{1 + \frac{W}{r_{j,k}\gamma_i}} ((1 - \overline{\alpha}) + \overline{f})$$

The packet scheduling module 33 is configured for operating according to a discrete timing structure, based on scheduling time $T_{sched}$. Scheduling time $T_{sched}$ paces the repetition of all calculations and actions in the procedure.

For each scheduling time $T_{sched}$ the procedure calculates the capacity that can be used for packet switched services also referred as residual capacity ($C_{res}$).

The maximum load on the downlink is a threshold defined by the operator and defines the downlink maximum capacity $\eta_{DL, max}$ of each cell:

$$c_{res} = \left[ \eta_{DJ,max} - \sum_{i=1}^{N_{RT}} \frac{1}{1 + \frac{W}{r_{j,k}\gamma_i}} ((1 - \overline{\alpha}) + \overline{f}) \right]$$

Where $N_{RT}$(ps) is the number of the circuit switched users in the cells.

For each new user requesting a packet switched service, a corresponding buffer is allocated in the system. The packet scheduling module 33 operates according to the characteristics of the buffer of each user.

It is assumed that the admission control function will allow access to the system by packet users of the interactive or background type, taking into account only their ability to transmit at the minimum rate contemplated in the transport format set (e.g., 8 Kbit/s) and not by taking into account the peak rate negotiated with the network. The packet scheduling module 33 takes care of this latter type of users, ensuring that they will transmit without congestioning the radio interface, by controlling and setting each time the dedicated channel rate, so that the mentioned limits for the downlink are not overcome.

At this time, by setting, based on the above listed parameters, the maximum downlink load, and knowing the circuit switched services in the system, it is possible to estimate the residual capacity that the base station 13 can offer to packet services, i.e. it is possible to know what resource portion can be allocated for the packet switched users.

In allocating packet resources, a first level criterion applied by the packet scheduling module concerns:
packet real time users, that request conversational or streaming service (RT packet services or users)
packet non real time users, that request interactive or background services (NRT packet users or services).

As shown in FIG. 2, where load for real time ($RT_{PS}$) users and non real time ($NRT_{BE}$) users in function of time is shown, the module 33 tries to adapt packet users transmission to dynamic variations in the residual capacity available.

Clearly, this occurs in a discrete timing basis. Calculations are repeated at each step, wherein the scheduling time $T_{sched}$, represents the time elapsed between two subsequent applications of the procedure. It will be assumed that, if a correct value is chosen for the scheduling time $T_{sched}$, the RT load will not vary between the steps. Selecting smaller values for the scheduling time $T_{sched}$, will make more dynamic and adaptive the application of the scheduling procedure to the system.

Priority calculation determines the order in polling the queues containing the user packets and is based substantially on two level criteria:
a) a first level priority criterion, related, as already explained, to $RT_{PS}$ or $NRT_{BE}$ packet membership: this is therefore an implicit priority, related to the intrinsic nature of the information carried by the packets;
b) a second level priority criteria, that is related to the operative conditions of the system and it is related to:
b1) buffer occupancy, for instance at the RLC level, and
b2) radio channel conditions.

In the preferred embodiment, a distinction is then made according to the higher buffer occupancy among users that are members of the same service class, i.e. by choosing, among the users having the same first level priority, the user having the highest buffer occupancy.

Among users having equal buffer occupancy level, the user exhibiting the best radio channel conditions is chosen for transmission.

Depending on the operating conditions, the order of application of the second level priority criteria can be inverted.

The buffer occupancy can be easily determined by evaluating the number of bytes present in the buffer.

The radio channel conditions can be evaluated based on Signal-to-Interference Ratio, e.g. by way of example by taking into account the information derived by the evaluation of a quantity, SIR_Error, defined as the difference between the measured value $SIR_{measured}$ and the target value ($SIR_{target}$) of the Signal-to-Interference Ratio.

FIG. 3 represents an exemplary calculation of the polling order of the queues for different users 1, 2, 3 and 4.

Once the optimal exploiting of the residual capacity is ensured, so that all the power available at the base station 13 is allocated, and after establishing the queues polling order, the procedure applies its resource allocation policy, i.e. it must decide how to divide the available capacity in an optimized way, by maximizing the overall throughput and minimizing delay for the users.

Thus, after performing the calculations related to the division of capacity with respect to the users, the packet scheduling module 33 calculates the maximum transport format TF that can be utilized for a specific user. The module also communicates to the MAC level through the transport format set TFS, that such information will be used in the selection of transport format at each transmission time interval TTI. Moreover, if necessary, transmission can be suspended or resumed.

The packet scheduling procedure aims at assigning to the user having the highest priority the transport format corresponding to the negotiated peak rate. If such an attempt fails, the procedure tries to allocate the immediately lower format. The attempts are repeated till the allocated rate fits the available capacity.

If, after allowing transmission at the maximum rate by the user having the highest priority, some capacity is still available in the cell, the packet scheduling module 33 repeats the step performed for the highest priority user on the user having the subsequent priority. This process is continued till the cell resources or the active users are completely exhausted, i.e. no residual capacity is unused.

FIG. 4 is a diagram showing the states that characterize the downlink transmission towards a user equipment 14.

The base station 13, with respect to the link with that specific user equipment 14 remains in Idle state (100), till packets begin filling the corresponding buffer.

The state transition from "Idle" to "Data to Transmit" (102) occurs upon verifying that a radio channel for that user needs to be set up, since the buffer is being filled by packets. Quick system reaction to changes, is important in order to avoid excessive delay accumulation in the buffer.

The permanence in this state is related to resource availability. At each step in the scheduling procedure, an evaluation is made as to possibly assign a data link to the user equipment; if the capacity available in the cell is sufficient, a Radio Access Bearer is created between the base station 13 and the user equipment 14 and the Data Transmission process can start. The system remains in this state as long as there are resources to allocate to the user equipment 14.

When available resources no longer exist, the procedure does not force the disruption of the radio link, but rather invokes, as an example, a standard procedure called CRLC-Suspend (Control RLC).

The user equipment 14 will be then in a suspension state (106) where it minimizes the radio interface resource occupancy, by minimizing accordingly interference, even if the link is still up starting from the RLC level.

In the suspension state the RLC entity no longer exchanges, i.e. no longer sends or receives, with the underlying MAC level PDUs (Protocol Data Units) with a sequence number higher than the number indicated by the suspend primitive. Once that the resume primitive is called, the RLC level will restart transmitting PDUs from the point at which this was previously discontinued.

The transport channel type switching module 32 monitors the transmission buffer of each single packet switched link in order to understand if the type of transport channel allocated for supporting a certain service is correct or not.

During normal operation of the network, there may be a need of dynamically adapting the transmission characteristics to the changes in operation by modifying e.g. the type of transport channel used.

The events that can trigger a transport channel type switching are:
uplink or downlink service renegotiation;
the congestion control module 42 forces a switch of all best-effort services from the dedicated channel to the common channel for solving a congestion case; and
radio channel conditions.

The service renegotiation is the typical case where a transport channel type switch is required.

In the exemplary case of a user that originally requests for a fast web browsing and then, during normal operation, continues his sessions with simple short messages, in this case the bit rate requirements on the radio link which is "always on" are substantially decreased and a transport channel type switching is required.

In order to trace when such a situation occurs, uplink and downlink transmission buffers are monitored as a function of thresholds set on such buffers.

When traffic volume increases, passing a certain threshold, an event 4A is determined and is reported to the S-RNC 11.

If this kind of event, schematically shown in the diagram of FIG. 5, representing traffic as function of time, occurs on the uplink or on the downlink, a switch from common channel to dedicated channel can be ordered.

If the traffic volume decreases under a certain threshold an event 4B is determined, that is reported to the S-RNC 11.

If this kind of event, schematically shown in FIG. 6, occurs on the uplink and on the downlink, a switch from dedicated channel to common channel can be ordered.

Of course, when a switch from common channel to dedicated channel is triggered, a new admission phase and dedicated channel allocation is required.

The behavior in this case corresponds to the behavior described for the admission control module 32 and the RAB management module. There is a strict dependence from the state and the load of the network.

The solution described here provides for the possibility of varying the threshold level that triggers the switch from common channel to dedicated channel and viceversa. This can be seen from FIGS. 5 and 6, where different threshold levels T1 e T2 are shown.

The variation of such threshold levels can occur in view of traffic parameters, such as the load status parameter SP, the packet congestion flag PCF, or the radio channel conditions.

For instance, in the normal operation state having reduced load and the packet congestion flag PCF not set, it is possible to encourage the use of the dedicated channel, thus ensuring better performance from the QoS point of view, since no critical situation is present from the point of view of the overall system load.

On the contrary, if the load status parameter SP indicates an alert operation state, and the packet congestion flag PCF is not set, the threshold is dynamically set in order to make the switch to dedicated channel more unlikely. On the other hand if the load status parameter SP indicates an alert operation state, and the packet congestion flag PCF is set, the threshold is dynamically set in order to avoid the usage of dedicated channels.

Finally, when the network operates in the congestioned state, the threshold is set in such a way that essentially prohibits switching to the dedicated channel, despite of the packet congestion flag PCF values.

In a particularly preferred embodiment, switching from dedicated channel to common channel may be ordered by the system also when the radio channel condition are very bad, so that the bit rate can be reduced, e.g. below 16 Kbps.

This allows for decreasing the bit rate associated to a radio link when either of a 4A type event or a 4B event occurs, i.e. when a threshold adapted to be set by the operator and indicating the bad quality of radio link is reached. To this purpose, for instance, the quantity SIR_Error can be used.

In connection with the operations performed by the Admission Control module 41, a first portion of the capacity of the network is allocated for real time services of the circuit switched and a quantity K [where k can be evaluated for instance as (Scaling Factor)+(1−Scaling Factor)*PCF] of the guaranteed bit rate for the packet real time services, while the remaining portion is managed by the packet scheduling module 33 in order to accommodate as many users as possible. In that respect, the packet scheduling module 33 aims at managing those resources that are not managed by the RRM as real time circuit switched services, in order to maximize the throughput and to minimize the delay of real time packet switched services $RT_{PS}$ and non real time best effort services $NRT_{BE}$ as described above.

After the admission phase is completed, it is up to the packet scheduling module 33 to change the transmission characteristics in order to respect the QoS requirements for each single user.

Once again it is recalled that for packet switched best effort services if no packet congestion flag PCF is set no proper admission is performed since each packet switched best effort is considered as a low bit rate service (e.g. 8Kbps uplink and downlink).

On the other hand packet switched real time services are taken into account in the admission phase. This is done by considering in the calculation that for each packed switched real time service a bit rate equal to Scaling_Factor*Guaranteed Bit Rate when PCF is set to 0 and equal to the guaranteed bit rate when the congestion packet flag PCF is set to 1. Scaling_Factor is a parameter that could be equal to, e.g., 0.5. In this case for $RT_{PS}$ the calculation for the admission decision is performed considering a bit rate equal to 0.5*Guaranteed Bit Rate when the packet congestion flag PCF is set to 0, and Guaranteed Bit Rate when the PCF is set to 1. In this case 0 and 1 are the only two values that the packet congestion flag PCF can assume.

The capacity adapted to be managed by the packet scheduling module 33 is the whole capacity of the cell minus the capacity used by circuit switched services. The packet scheduling module 33 evaluates this capacity at each scheduling time and acts in order to accommodate as many as packet switched services as possible. In order to monitor performance of the packet transmission at every scheduling time, the procedure checks the QoS for each single link. As soon as performance starts to become worse, no more packet switched users are accepted. This condition is triggered for each single link by the average throughput and by the average delay of each packet in the buffer.

Specifically, if the packet scheduling module 33 realizes that one of the following condition is true:

the Average Throughput of packet switched best effort service is less than the parameter Bit_Rate_Min_BE, indicating the minimum best effort bit rate;

the average delay for packet switched best effort service is greater than the parameter Delay_Max_BE, indicating the maximum best effort delay;

the average delay for packet switched real time service is greater than the parameter Delay_Max_RT, indicating the maximum real time delay; the following actions are taken:

in a preferred embodiment the packet congestion flag PCF is set.

at every scheduling time the transport channel type switching module 32 orders a switch of a packet switched service from dedicated channel (DCH/DCH) to common channel (RACH/FACH) for best effort services;

every scheduling time the following three conditions are checked again:

the average throughput of packet switched best effort service is less than the difference between parameters: Bit Rate_Min _BE–Hysteresis_Bit Rate_Min_BE. Bit_Rate_Min_BE: represents the minimum bit rate that the operator wants to guarantee for Best Effort service; Hysteresis_Bit Rate_Min_BE: represents an hysteresis applied to the previous parameter introduced in order to avoid ping pong effect, as known to a skilled in the field;

the average delay for packet switched best effort service is greater than the sum between parameters: Delay_Max_BE+Hysteresis_Delay_Max_BE;

Delay_Max_BE: represents the maximum delay that the operator wants to guarantee for Best Effort service; Hysteresis_Delay_Max_BE: represents an hysteresis applied to the previous parameter introduced in order to avoid ping pong effect, as known to a skilled in the field;

the average delay for packet switched real time service is greater than the sum of parameters Delay_Max_RT+ Hysteresis_Delay_Max_RT. Delay_Max_RT: represents the maximum delay that the operator wants to guarantee for real time packet services $RT_{PS}$; Hysteresis_Delay_Max_RT: represents an hysteresis applied to the previous parameter introduced in order to avoid ping pong effect, as known to a skilled in the field.

If all of these last three conditions are true, the packet congestion flag PCF is reset and regular packet switch and Transport Channel Type Switching operation is resumed.

Operation of the RAB Management module 31 will now be described.

The RAB management module 31 adopts different behaviors as a function of the load state indicated by the status monitor module 43 and as a function of the packet congestion flag set by the packet status monitor. Specifically:

if the load status parameter SP indicates the normal operation state, the RAB management allocates a dedicated channel on both uplink and downlink for all the real time packet switched services $RT_{PS}$ (with a bit rate function of the required bit rate) and for all the packet switched services $NRT_{BE}$ belonging to interactive and background classes with a maximum bit rate greater than, e.g., 16 Kbps; the RAB management module 31 associates to each dedicated channel allocated to a $NRT_{BE}$ the minimum Transport Format of the Transport Format Set that can be selected by the packet scheduler equal to, e.g., 8 Kbps for both uplink and downlink. For all the packet switched services $NRT_{BE}$ with a maximum bit rate less than 16 Kbps the RAB management module 31 allocates a common channel on the uplink, i.e. a RACH channel, and a common channel on the downlink, i.e. a FACH channel. Whether packet congestion flag PCF is set no real time packet switched services $RT_{PS}$ (e.g PS streaming) greater than e.g. UL 64 DL 64 are allowed, i.e. $RT_{PS}$ that requires a bit rate greater than e.g. 64 kbps are rescaled to UL 64/DL 64.

if the load status parameter SP indicates an alert operation state, the RAB management module 31 allocates a DCH or dedicated channel on both uplink and downlink for the real time packet switched services (with a bit rate function of the required bit rate and not higher than UL 64 and DL 64) and for all the packet switched services $NRT_{BE}$, i.e. belonging to interactive and background classes with a maximum bit rate greater than, e.g., 64 Kbps; the RAB management module 31 associates to each dedicated channel a minimum Transport Format of the Transport Format Set that is, e.g., 8 Kbps for both uplink and downlink. For all the packet switched services $NRT_{BE}$ with a maximum bit rate less than 64 Kbps, the RAB management allocates a common RACH channel on the uplink and a common FACH channel on the downlink. In this state no RAB circuit switched (neither conversational nor streaming) or real time packet switched $RT_{PS}$ greater than UL 64 DL 64 are allowed; RAB with higher bit rate are automatically re-scaled to UL 64 DL 64. If packet congestion flag PCF is set real time packet switched (e.g. streaming) higher than, e.g., 32 kbps are re-scaled to,e.g. 32 kbps UL and DL;

if the status parameter load SP indicates the Pre-congestioned Operation state the RAB management allocates a common RACH channel on the uplink and a common FACH channel on the downlink for all the packet switched services $NRT_{BE}$, i.e. belonging to Interactive and background classes; neither real time packet switched services nor circuit switched service different from the AMR voice service or emergency calls are supported in this state.

Now the operation of the admission control module 41 will be detailed. The admission control module 41 operates as a function of the states set by the status monitor 43, based on the following strategies:

when the network operates in the normal state operation and the packet congestion flag PCF is not set all the $NRT_{BE}$, PS_Best_Effort whose maximum bit rate is greater then, e.g., 16 Kbps are evaluated as, for instance, a 8 kbps service despite of the maximum bit rate required by the service. The PS_Best_Effort service is evaluated in the admission decision taking into account in the resource occupation calculation a minimum portion of its maximum bit rate because its QoS class is a best effort one and its admission is not binding since its instantaneous throughput can be reduced at each time by the system. 8 kbps is a numerical value in the definition above that is provided merely as example: it is up to the operator to set these values. All PS best effort whose maximum bit rate is lower than, e.g., 16 kbps, are allocated on common channels and then follows the normal rules of admission control for common channels.

The packet switched real time service are taken into account in the admission phase by considering in the calculation for each packet switched real time service a bit rate equal to Scaling factor*Guaranteed bit rate;

when the network operates in the Normal state operation NO and the packet congestion flag PCF is set all the circuit switched calls and the packet switched real time services are evaluated for acceptance by the admission control. The packet switched real time services are considered as circuit switched RT services: as already highlighted all packet switched real time services higher than UL 64 and DL 64 are re-scaled to UL 64/DL 64. All the packet switched best effort services are blocked until the packet switch scheduling module 33 resets the packet congestion flag PCF; in a second embodiment, when packet congestion flag PCF is set the packet switched best effort services are admitted taking into account, in the admission decision, an admission_factor*maximum_Throughput. As an example the admission factor could be 90% of the maximum throughput; this means that in order to decide whether a certain services could be admitted or not, the load associate to it is calculated assuming a 90% of the maximum throughput;

when the network operates in the alert operation state AO and the packet congestion flag PCF is not set all the PS_Best_Effort whose maximum bit rate is greater then, e.g., 64 Kbps are evaluated as, for instance, a 8 kbps service despite of the maximum bit rate required by the service. All PS best effort whose maximum bit rate is lower than, e.g., 64 kbps, are carried over common channels and then are subject to the normal rules of admission control on common channels. All the CS services are evaluated for admission by admission control. As already highlighted in the Alert Operation state AO when PFC is not set all the packet switched real time services with higher bit rates than UL 64 DL 64 are rescaled by the RAB management module to UL 64 DL 64; as a consequence the maximum bit rate for packet switched real time services in this state when PCF is not set is 64 kbps for uplink and downlink. The packet switched real time services are taken into account in the admission phase by considering in the calculation for each packet switched real time service a bit rate equal to Scaling_Factor*Guaranteed Bit Rate;

when the network operates in the alert operation state AO and the packet congestion flag PCF is set all packet switched best effort services $NRT_{BE}$ are blocked. As already highlighted in the Alert Operation state AO when PCF is set all the packet switched real time services with higher bit rates than, e.g., UL 32 DL 32 are rescaled by the RAB management module to e.g. UL 32 DL 32 Kbps; as a consequence the maximum bit rate for packet switched real time services in this state when PCF is set is 32 kbps for uplink and downlink. The packet switched real time services are taken into account in the admission phase by considering them as CS real time services;

when the network operates in the pre-congestioned operation state PCO no real time packet switched services are accepted (except emergency services). If PCF is not set, all PS best effort services are allocated on common channels and they follow the normal rules of admission for common channels; if PCF is set, no PS best effort service is accepted. As a matter of fact only voice service and emergency calls are accepted.

A method and system for managing radio resources in mobile communication networks have thus been described herein that permit optimization of the transmitted power in order to minimize the interference level. To that end the instant description an integrated architecture for the admission, congestion control, RAB management and packet scheduling. Operation of that architecture is based on the introduction and evaluation of a load status parameter and a packet status representative the load of the network and the effective usage of packet resources.

As an alternative of the preferred embodiment the load status parameter SP may take on two different states S, depending on the ranges of such values, namely:

full operation state (FO): this occurs when the following two conditions are simultaneously verified:

(RTWP/Thermal Noise Power)≦80% of the maximum Noise_Rise on the uplink;

Transmitted Carrier Power≦70% Maximum Allowed Power on the Downlink;

alert operation state (AO): this load state is reached when the following two conditions are simultaneously verified:

80% of the maximum Noise_Rise on the uplink< (RTWP/Thermal Noise Power)≦90% of the maximum Noise_Rise on the uplink;

180% Maximum Allowed Power on the Downlink≦Transmitted Carrier Power≦90% Maximum Allowed Power on the Downlink Numerical values in the definitions above are provided merely as example: it is up to the operator to set these values.

Operation of the RAB Management module 31 will now be described.

The RAB management module 31 adopts different behaviors as a function of the load state indicated by the status monitor module 43. Specifically:

- if the load status parameter SP indicates the full operation state, the RAB management allocates a dedicated channel on both uplink and downlink for all the real time packet switched services $RT_{PS}$ and for all the packet switched services belonging to interactive and background $NRT_{BE}$ classes with a maximum bit rate greater than, e.g., 16 Kbps; the RAB management module 31 associates to each dedicated channel allocated to a $NRT_{BE}$ the minimum Transport Format of the Transport Format Set that can be selected by the packet scheduler equal to, e.g., 8 Kbps for both uplink and downlink. For all the packet switched services $NRT_{BE}$ with a maximum bit rate less than 16 Kbps the RAB management module 31 allocates a common channel on the uplink, i.e. a RACH channel, and a common channel on the downlink, i.e. a FACH channel. In that case if PCF is not set no control is performed by RAB management. Whether PCF is set no CS services (conversational or streaming) and no real time packet switched (e.g PS streaming) greater than UL 64 DL 64 are allowed, i.e. $RT_{PS}$ that requires a bit rate greater than e.g. 64 kbps are rescaled to 64;
- if the load status parameter SP indicates an alert operation state, the RAB management module 31 a common channel RACH/FACH for all the packet switched services belonging to interactive and background classes with a maximum bit rate lower than, e.g., 64 Kbps. In this state no RAB circuit switched (conversational or streaming) or real time packet switched greater than UL 64 DL 64 are admitted; if PCF is set all the packet switched real time are re-scaled to 32 kbps UL and DL, i.e. $RT_{PS}$ that requires a bit rate greater than e.g. 32 kbps are rescaled to 32.

Now the operation of the admission control module 41 will be detailed. The admission control module 41 operates as a function of the states set by the status monitor 43, based on the following strategies:

- when the network operates in the full operation state and the packet congestion flag PCF is not set, PS_Best_Effort greater than, e.g., 16 kbps are evaluated as, for instance, a 8 kbps service in despite of the maximum bit rate required by the service. The PS_Best_Effort service is evaluated in the admission decision taking into account in the resource occupation calculation a minimum portion of its maximum bit rate because its QoS class is a best effort one and its admission is not binding since its instantaneous throughput can be reduced at each time by the system. 8 kbps is a numerical value in the definition above that is provided merely as example: it is up to the operator to set these values. All PS best effort whose maximum bit rate is lower than, e.g., 16 kbps, are allocated on common channels and then follows the normal rules of admission control for common channels. The packet switched real time service are taken into account in the admission phase by considering in the calculation for each packet switched real time service a bit rate equal to Scaling_Factor*Guaranteed Bit Rate;
- when the network operates in the Full operation state FO and the packet congestion flag PCF is set all the circuit switched calls and the packet switched real time services are evaluated for acceptance by the admission control. The packet switched real time services are considered as circuit switched RT services: all packet switched real time services higher than UL 64 and DL 64 are re-scaled to UL 64/DL 64. All the packet switched best effort services are blocked until the packet switch scheduling module 33 resets the packet congestion flag PCF; in a second embodiment, when PCF is set the packet switched best effort services are admitted taking into account, in the admission decision, an admission_factor*maximum_Throughput. As an example the admission factor could be 90% of the maximum throughput; this means that in order to decide whether a certain services could be admitted or not, the load associate to it is calculated assuming a 90% of the maximum throughput;
- congestion when the network operates in the alert operation state AO and the packet congestion flag PCF is not set all the PS_Best_Effort whose maximum bit rate is greater then, e.g., 64 Kbps are evaluated as, for instance, a 8 kbps service despite of the maximum bit rate required by the service. All PS best effort whose maximum bit rate is lower than, e.g., 64 kbps, are carried over common channels and then are subject to the normal rules of admission control on common channels. All the CS services are evaluated for admission by admission control. As already highlighted in the Alert Operation state AO when PCF is not set all the packet switched real time services with higher bit rates than UL 64 DL 64 are rescaled by the RAB management module to UL 64 DL 64; as a consequence the maximum bit rate for packet switched real time services in this state when PCF is not set is 64 kbps for uplink and downlink. The packet switched real time services are taken into account in the admission phase by considering in the calculation for each packet switched real time service a bit rate equal to Scaling_Factor*Guaranteed Bit Rate;
- when the network operates in the alert operation state AO and the packet congestion flag PCF is set all packet switched best effort services $NRT_{BE}$ are blocked. As already highlighted in the Alert Operation state AO when PCF is set all the packet switched real time services with higher bit rates than, e.g., UL 32 DL 32 are reescaled by the RAB management module to e.g. UL 32 DL 32 Kbps; as a consequence the maximum bit rate for packet switched real time services in this state when PCF is set is 32 kbps for uplink and downlink. The packet switched real time services are taken into account in the admission phase by considering them as CS real time services.

In order to calculate the load system parameter SP, in the preferred embodiment measurements are taken into account. In order to evaluate the load on the uplink or on the downlink different metrics could be considered. A third embodiment is represented by the same arrangement described with the exception of the load status parameter SP evaluation that is performed by calculating the number of connections on the uplink or on the downlink. As a fourth alternative the load SP could be evaluated estimating the load on the uplink or downlink by means of the well known pole capacity theory on the uplink and downlink.

Consequently, without prejudice to the underlying principles of the invention, the details and the embodiments may vary, also appreciably, with reference to what has been described by way of example only, without departing from the scope of the invention as defined by the annexed claims.

The invention claimed is:

1. A method for managing radio resources in a mobile communications network having a plurality of cells, wherein said radio resources are managed by a plurality of radio resources management procedures arranged for
having available at least one maximum downlink load value representative of the maximum total load level of each cell of said network; and for
measuring at least one uplink load value and at least one current downlink total load value of each cell of said network, comprising the steps of:
defining at least two status parameters comprising:
a first status parameter or load status parameter having a first plurality of states, each of the first plurality of states determined by a first set of status ranges, said first set of status ranges being a range of values based on said measured uplink load value and said current downlink total load value, wherein said first parameter being representative of a level of interference of said network;
a second status parameter or packet congestion flag having a second plurality of states, each of the second plurality of states determined by a second set of status ranges, said second set of status ranges being a range of values based on a congestion status in a packet management procedure; and
adopting different sets of managing strategies associated with the radio resources management procedures of said network as a function of a state of the first and the second status parameters.

2. The method of claim 1, wherein the radio resources management procedures of said network comprise at least a channel allocation or RAB management procedure, a packet transmission optimization procedure and a capacity optimization procedure.

3. The method of claim 2, comprising the steps of:
associating with said packet transmission optimization procedure said packet management procedure;
ascertaining the reaching of said congestion status in said packet management procedure; and
triggering the second status parameter or the packet congestion flag when said congestion status is reached.

4. The method of claim 3, comprising the step of defining services requesting radio resources according to quality of service information classes, said services comprising real time circuit switched services, real time packet switched services and non real time best effort services.

5. The method of claim 2, wherein said first set of status ranges comprises at least two status ranges selected on the set of normal operation state, alert operation state and pre-congestioned operation state of said network.

6. The method of claim 5, wherein said measuring an uplink load value comprises measuring a receiver wide band power and said measuring at least one downlink total load value comprises measuring a transmitted carrier power.

7. The method of claim 6, wherein said normal operation state is reached by said first status parameter when simultaneously:
the ratio of receiver wide band power to a thermal noise power is less than or equal to a first percentage value of maximum noise rise on the uplink; and
the transmitted carrier power is less than or equal to a first value of a maximum allowed power on the downlink;
wherein said alert operation state is reached by said first status parameter when simultaneously:
the ratio of receiver wide band power to thermal noise power is greater than said first percentage value and less than or equal to a second percentage value of maximum noise rise on the uplink;
the transmitted carrier power is greater than said first value of maximum allowed power on the downlink and less than or equal to a second value of maximum allowed power on the downlink; and
wherein said pre-congestioned operation state is reached by said first status parameter when simultaneously:
the ratio of receiver wide band power to thermal noise power is greater than said second percentage value and less than or equal to the maximum noise rise on the uplink; and
the transmitted carrier power is greater than the second value of maximum allowed power on the downlink and less than or equal to the maximum allowed power on the downlink.

8. The method of claim 2, wherein said capacity optimization procedure comprises a service admission control procedure and wherein said service admission control procedure hinders real time admission for packet switched services.

9. The method of claim 8, comprising the step of using said packet congestion flag for controlling operation of said channel allocation procedure and of said service admission control procedure.

10. The method of claim 9, wherein said service admission control procedure and said channel allocation procedure comprise the following steps:
allocating in the channel allocation procedure a dedicated channel for real time packet switched services with a predetermined bit rate function, wherein said allocation operation further comprises the sub-steps of:
admitting the service in the service admission control procedure if said packet congestion flag is not triggered, taking into account a bit rate equal to a scaling factor of a guaranteed bit rate; and
handling the service as a CS real time service if the packet congestion flag is triggered;
allocating in the channel allocation procedure common channels for all the non real time best effort services whose maximum bit rate is less than or equal to a first predetermined bit rate value; and
allocating in the channel allocation procedure a dedicated channel for all the non real time best effort services whose maximum bit rate is greater than said first predetermined value, wherein said allocation operation further comprises the sub-steps of:
admitting the service in the admission control procedure by performing a check based on a second predetermined bit rate value if the packet congestion flag is not triggered; and
refusing all the non real time best effort services in the admission control procedure if the packet congestion flag is triggered or, alternatively, admitting the service in the admission control procedure by performing a check based on a predetermined admission factor required by the service.

11. The method of claim 3, wherein said packet management procedure comprises a packet scheduling procedure that comprises managing an available capacity at each occurrence of a discrete scheduling time by:
evaluating a residual capacity available for packet switched services;
evaluating the priorities of the different users;
evaluating the bit rate to be assigned to each user; and monitoring the performance against a set of predetermined conditions in order to determine whether the system is in the congestion status and managing said congestion status.

12. The method of claim 11, wherein said evaluating the priorities of the different users comprises considering two level criteria:
   the real time packet switched services and the non real time best effort services; and
   operative conditions of the system.

13. The method of claim 11, wherein said evaluating the bit rate to be assigned to each user comprises:
   assigning to the user having the highest priority the bit rate corresponding to the negotiated peak rate or, if such an attempt fails, allocating the immediately lower bit rate.

14. The method of claim 11, wherein said step of monitoring the performance against the set of predetermined conditions comprises monitoring that:
   the average throughput of non real time best effort services is less than a best effort minimum bit rate parameter;
   the average delay for the non real time best effort services is greater than a maximum delay parameter;
   the average delay for packet switched real time services is greater than a real time maximum delay parameter; and wherein
   the step of managing congestion status comprises:
   triggering said packet congestion flag;
   ordering at each scheduling time occurrence through a transport channel type switching procedure a switching of packet switched services from dedicated channel to common channel for best effort services; and
   checking every scheduling time the average throughput and the average delay for non real time best effort services and the average delay of the real time packet switched services, also taking into account suitable hysteresis, in order to reset said packet congestion flag and resume regular operation.

15. The method of claim 3, wherein said packet management procedure comprises a transport channel type switching procedure for monitoring buffers associated with links adapting transmission characteristics by triggering a switch from common channel to dedicated channel or viceversa, in function of one or more traffic thresholds and being able to vary the thresholds in function of said first status parameter, or of said second status parameter, or of the radio channel conditions.

16. The method of claim 5, wherein said different sets of managing strategies of said network for said channel allocation procedure comprises the steps of:
   if said first status parameter reaches the normal operation state:
   if the congestion packet flag is not triggered allocating a dedicated channel for all real time packet switched services with a predetermined bit rate function; or alternatively,
   if the congestion packet flag is triggered allocating a dedicated channel for all real time packet switched services with a bit rate function of the required bit rate and not higher than first predetermined bit rate values both in uplink and downlink;
   allocating a dedicated channel for all the non real time best effort services with a maximum bit rate greater than a second predetermined bit rate value and associating with said dedicated channel a predetermined minimum bit rate; and
   allocating a common channel for all the non real time best effort services with a maximum bit rate less than said second predetermined value; and
   if said first status parameter reaches the alert operation state:
   if the congestion packet flag is not triggered allocating for all real time packet switched services a dedicated channel with a bit rate function of the required bit rate and up to first predetermined bit rate values both in uplink and downlink, or alternatively,
   if the congestion packet flag is triggered, allocating for all real time packet switched services a dedicated channel with a bit rate function of the required bit rate and up to third predetermined bit rate values both in uplink and downlink lower than said first predetermined bit rate values;
   allocating for all the non real time best effort services with a maximum bit rate greater than a fourth predetermined bit rate value a dedicated channel and associating with said dedicated channel the predetermined minimum bit rate; and
   allocating for all the non real time best effort services with a maximum bit rate less than said fourth predetermined bit rate value a common channel; and
   if the first status parameter reaches the pre-congestioned operation state:
   allocating for all the non real time best effort services a common channel.

17. The method of claim 8, wherein said different sets of managing strategies for said admission control procedure comprise the steps of:
   if said first status parameter reaches the normal operation state:
   if the congestion packet flag is not triggered accepting packet switched real time services taking into account for the acceptance evaluation operation for each packet switched real time service a bit rate equal to a predetermined scaling factor multiplied by a maximum bit rate required; and
   evaluating non real time best effort services whose maximum bit rate is greater than a first predetermined bit rate value as having a fixed bit rate value lower than the first predetermined value; and
   accepting on common channels the non real time best effort services whose maximum bit rate is lower than the first predetermined bit rate value; or alternatively,
   if said congestion packet flag is triggered, accepting the packet switched real time as circuit switched real time services and blocking non real time best effort services or, alternatively, admitting the service in the admission control procedure by performing a check based on a predetermined admission factor as a percentage of the maximum bit rate required by the service;
   if said first status parameter reaches the alert operation state:
   accepting packet switched real time up to a second predetermined bit rate value considering in the acceptance evaluation operation for each packet switched real time service a bit rate equal to a predetermined scaling factor multiplied for a maximum bit rate required if the congestion packet flag is not triggered, and accepting the packet switched real time as circuit switched real time services if said congestion packet flag is triggered;
   if the packet congestion flag is not triggered, evaluating the non real time best effort services whose maximum bit rate is greater than a third predetermined bit rate value as having a further fixed bit rate value, lower than the third predetermined value; and accepting on common channels the non real time best effort services whose maximum bit rate is lower than the third predetermined bit rate value; or alternatively, if said congestion packet flag is triggered, blocking any packet switched best effort services;

if said first status parameter reaches the pre-congestion state, rejecting any packet switched real time service, and if the packet congestion flag is not set, accepting all the non real time best effort services on common channels, and if the packet congestion flag is set, not accepting either non real time best effort services or all the circuit switched services with the exception of the voice service and the emergency calls.

18. The method of claim 1, wherein said mobile communications network is a code division multiple access mobile network.

19. The method of claim 1, wherein said maximum downlink load value representative of the total load level of the node is the maximum number of users nominally admitted in the downlink, the uplink load value is represented by the number of users in the uplink and the current downlink total load value is represented by the number of users in the downlink.

20. The method of claim 1, wherein said first status parameter adapted to reach a first set of status ranges, depends on a number of connections on the uplink as said measured uplink load value and on a number of connections on the downlink as said current downlink total load value.

21. The method of claim 1, wherein said first status parameter adapted to reach a first set of status ranges, depends on a measured uplink load value and on a current downlink total load value that are estimated by means of the pole capacity theory.

22. A system for managing radio resources in a mobile communications network comprising a plurality of cells wherein said radio resources are managed by a plurality of radio resources management procedures arranged for having available at least one maximum downlink load value representative of the total load level of each cell of said network, and for measuring at least one uplink load value and at least one downlink total load value of each cell of said network, comprising:

measuring modules for measuring said receiver uplink load value and at least one downlink total load value;

a status monitoring module configured for evaluating a first status parameter or load status parameter of the network having a first plurality of states, each of the first plurality of states determined by a first set of status ranges, said first set of status ranges being a range of values based on said measured uplink load value and said current downlink total load value, wherein said first parameter or load status parameter being representative of a level of interference of said network;

a packet status monitor module associated with a packet management module and configured for evaluating a second status parameter or a packet congestion flag having a second plurality of states, each of the second plurality of states determined by a second set of status ranges, said second set of status ranges being a range of values based on a congestion status through said packet management module; and managing modules for adopting different sets of managing strategies associated with the radio resources management procedures of said network as a function of a state of said first status parameter and said second status parameter.

23. The system of claim 22, wherein said status monitoring module is capable of applying said different set of managing strategies at least to a channel allocation management module, to a packet transmission optimization module and to a capacity optimization module.

24. The system of claim 23, wherein said packet transmission optimization module comprises said packet status monitor module and wherein said packet status monitor module is configured for triggering the second status parameter or the packet congestion flag when in the packet management module said congestion status is reached.

25. The system of claim 24, wherein said system is configured for defining services according to quality of service information classes, said services comprising real time circuit switched services, real time packet switched services and non real time best effort services.

26. The system of claim 23, wherein said first set of status ranges comprises at least two status ranges selected on the set of normal operation state, alert operation state and pre-congestioned operation state of said network.

27. The system of claim 26, wherein said measuring modules are configured for measuring as a uplink load value a receiver wide band power and as a at least one downlink total load value a transmitted carrier power.

28. The system of claim 27, wherein said normal operation state is reached by said first status parameter when said measuring modules simultaneously yield:

a ratio of receiver wide band power to a thermal noise power less than or equal to a first percentage value of maximum noise rise on the uplink;

a transmitted carrier power which is less than or equal to a first value of a maximum allowed power on the downlink;

wherein said alert operation state is reached by said first status parameter when said measuring modules simultaneously yield:

a ratio of receiver wide band power to thermal noise power greater than or equal to said first percentage value and less than or equal to that of a second percentage value of the maximum noise rise on the uplink; and a transmitted carrier power is greater than or equal to said first value of maximum allowed power on the downlink and less than or equal to a second value of maximum allowed power on the downlink; and wherein said pre-congestioned operation state is reached by said first status parameter when said measuring modules simultaneously yield:

a ratio of receiver wide band power to thermal noise power greater than or equal to said second percentage value and less than or equal to that of the maximum noise rise on the uplink; and a transmitted carrier power greater than or equal to the second value of maximum allowed power on the downlink and less than or equal to the maximum allowed power on the downlink.

29. The system of claim 13, wherein said capacity optimization module comprises a service admission control module configured for hindering real time admission for packet switched services.

30. The system of claim 29, wherein said packet congestion flag is capable of controlling operation of said channel allocation module and said service admission control module.

31. The system of claim 30, wherein said service admission control module and said capacity optimization module are configured for:
- allocating through said channel allocation management module a dedicated channel for real time packet switched services with a predetermined bit rate function, wherein said allocation operation further comprises:
- admitting the service in the service admission control module, if said packet congestion flag is not triggered, taking into account a bit rate equal to a scaling factor of a guaranteed bit rate;
- handling the service as a real time service if the packet congestion flag is triggered;
    - allocating through said channel allocation management module, common channels for all the non real time best effort services whose maximum bit rate is less than or equal to a first predetermined bit rate value; and
    - allocating through said channel allocation management module a dedicated channel for all the non real time best effort services whose maximum bit rate is greater than said first predetermined value by:
        - admitting the service through the admission control module by performing a check based on a second predetermined bit rate value if the packet congestion flag is not triggered; and
        - refusing all the non real time best effort services through the admission control module if the packet congestion flag is triggered or, alternatively, admitting the service in the admission control procedure by performing a check based on a predetermined admission factor required by the service.

32. The system of claim 24, wherein said packet management module comprises a packet scheduling module configured for managing an available capacity at each occurrence of a scheduling time, and further configured for:
- evaluating a residual capacity available for packet switched services;
- evaluating the priorities of the different users;
- evaluating the bit rate to be assigned to each user; and
- monitoring the performance against a set of predetermined conditions in order to determine whether the system is in the congestion status and managing said congestion status.

33. The system of claim 24, wherein said packet management module comprises a transport channel type switching module configured for monitoring buffers associated to links, adapting transmission characteristics by triggering a switch from common channel to dedicated channel or viceversa, in function of one or more traffic thresholds and being able to vary the thresholds in function of said first status parameter, or of said second status parameter, or of the radio channel conditions.

34. The system of claim 26, wherein said channel allocation management module is further configured for:
- if said first status parameter reaches the normal operation state:
    - if the congestion packet flag is not triggered, allocating a dedicated channel for all real time packet switched services with a bit rate function of the required bit rate; or alternatively,
    - if the congestion packet flag is triggered, allocating a dedicated channel for all real time packet switched services with a bit rate function of the required bit rate and not higher than first predetermined bit rate values both in uplink and downlink;
    - allocating a dedicated channel for all the non real time best effort services with a maximum bit rate greater than a second predetermined bit rate value and associating with said dedicated channel a predetermined minimum bit rate; and
    - allocating a common channel for all the non real time best effort services with a maximum bit rate less than said second predetermined value; and
- if said first status parameter reaches the alert operation state:
    - if the congestion packet flag is not triggered allocating for all real time packet switched services a dedicated channel with a bit rate function of the required bit rate and up to first predetermined bit rate values both in uplink and downlink; or alternatively,
    - if the congestion packet flag is triggered, allocating for all real time packet switched services a dedicated channel with a bit rate function of the required bit rate and up to third predetermined bit rate values both in uplink and downlink lower than said first predetermined bit rate values;
    - allocating for all the non real time best effort services with a maximum bit rate greater than a fourth predetermined bit rate value a dedicated channel and associating with said dedicated channel the predetermined minimum bit rate; and
    - allocating for all the non real time best effort services with a maximum bit rate less than said fourth predetermined bit rate value a common channel; and
    - if the first status parameter reaches the pre-congestioned operation state:
        - allocating for all the non real time best effort services a common channel.

35. The system of claim 29, wherein said admission control module is configured for:
- if said first status parameter reaches the normal operation state:
    - if the congestion packet flag is not triggered, accepting packet switched real time services taking into account for the acceptance evaluation operation for each packet switched real time service a bit rate equal to a predetermined scaling factor, multiplied by a maximum bit rate required; and
    - evaluating non real time best effort services whose maximum bit rate is greater than a first predetermined bit rate value as having a fixed bit rate value lower than the first predetermined value; and
    - accepting on common channels the non real time best effort services whose maximum bit rate is lower than the first predetermined bit rate value; or, alternatively,
    - if said congestion packet flag is triggered, accepting the packet switched real time as circuit switched real time services and blocking non real time best effort services or, alternatively, admitting the service in the admission control procedure by performing a check based on a predetermined admission factor as a percentage of the maximum bit rate required by the service; and
- if said first status parameter reaches the alert operation state:
    - accepting packet switched real time up to a second predetermined bit rate value considering in the acceptance evaluation operation for each packet switched real time service a bit rate equal to a predetermined scaling factor multiplied for a maximum bit rate required if the congestion packet flag is not triggered, and accepting the packet switched real time as circuit switched real time services, if said congestion packet flag is triggered; and if the packet congestion flag is not triggered, evaluating the non real time best effort services whose maximum bit rate is greater than a third predetermined bit rate value as having a further fixed bit rate value, lower than the third predetermined value; and accepting on common channels the non real time best effort services whose maximum bit rate is lower than the third predetermined bit rate value; or, alternatively, if said congestion packet flag is triggered, blocking any packet switched best effort services; and if said first status parameter reaches the pre-congestion state, rejecting any packet switched real time service and, if packet congestion flag is not set, accepting all the non real time best effort services on common channels, and, if packet congestion flag is set, not accepting either non real time best effort services, or all the circuit switched services with the exception of the voice service and the emergency calls.

36. The system of claim 22, wherein said mobile communications network is a code division multiple access mobile network.

37. The system of claim 22, wherein said maximum downlink load value representative of the total load level of the node is the maximum number of users nominally admitted in the downlink, while the uplink load value is represented by the number of users in the uplink and the current downlink total load value is represented by the number of the users in the downlink.

38. A telecommunication network comprising a system according to claim 22.

39. A computer readable medium encoded with a computer program product loadable into a memory of at least one computer, the computer program product comprising software code portions for performing the method of claim 1.

* * * * *